United States Patent [19]

Ewald

[11] Patent Number: 5,421,381

[45] Date of Patent: Jun. 6, 1995

[54] REUSABLE USED OIL FILTER AND OIL RECYCLING CONTAINER

[76] Inventor: Bart W. Ewald, 2466 N. Heideke, Seguin, Tex. 78155

[21] Appl. No.: 289,246

[22] Filed: Aug. 11, 1994

[51] Int. Cl.$^6$ .............................. B65B 1/04; B65B 3/04
[52] U.S. Cl. .................................. 141/98; 141/106; 141/364; 141/366; 220/573; 184/1.5; 184/106
[58] Field of Search ............ 141/98, 106, 247, 311 A, 141/325, 326, 332, 339, 364, 366; 220/573; 184/1.5, 106

[56] References Cited

U.S. PATENT DOCUMENTS

| 421,754 | 2/1890 | Pannill | 141/106 |
|---|---|---|---|
| 3,703,956 | 11/1972 | Oswalt | 206/47 R |
| 4,010,863 | 3/1977 | Ebel | 220/1 C |
| 4,020,922 | 5/1977 | Klasel | 184/1.5 |
| 4,149,575 | 4/1979 | Fisher | 141/98 |
| 4,296,838 | 10/1981 | Cohen | 184/106 |
| 4,301,841 | 11/1981 | Sandow | 141/98 |
| 4,332,282 | 6/1982 | Strange | 141/1 |
| 4,376,703 | 3/1983 | Krauss | 210/238 |
| 4,403,692 | 9/1983 | Pollacco | 206/223 |
| 4,488,584 | 12/1984 | Hestehave et al. | 141/339 |
| 4,533,042 | 8/1985 | Pollacco | 206/223 |
| 4,632,268 | 12/1986 | Melzi et al. | 220/1 C |
| 4,702,290 | 10/1987 | Perez | 141/332 |
| 4,802,599 | 2/1989 | Hill | 220/1 C |
| 4,815,591 | 3/1989 | Tivy | 206/223 |
| 4,823,947 | 4/1989 | Maynard, Jr. | 220/573 |
| 4,974,647 | 12/1990 | Eastom | 141/98 |
| 5,105,860 | 4/1992 | Connor | 141/106 |

Primary Examiner—Ernest G. Cusick
Assistant Examiner—Steven O. Douglas

[57] ABSTRACT

The present invention provides a way for the do-it-yourself oil and filter changer to safely and cleanly drain used oil from the filter, and sealing and storing both filter and drained filter oil in the same container that crankcase oil is stored while keeping the drained filter dry and separate from the drained and collected oil. The invention solves a recent problem that has become apparent as used oil filters have become a culprit of land and water pollution. By allowing the do-it-yourselfer a convenient, safe and clean means to manage his used oil filter along with his used oil, it hampers the tendency to improperly dispose of these recyclable wastes by allowing more convenient and cleaner transport of these wastes to a collection center. This reusable container also eliminates the disposable items currently being used to transport used oil filters, thus eliminating these oily wastes from the wastestream.

14 Claims, 12 Drawing Sheets

REUSABLE USED OIL FILTER AND OIL RECYCLING CONTAINER

BACKGROUND—FIELD OF INVENTION

The field of invention relates to a recycling apparatus and more specifically pertains to a waste oil filter and waste oil recycling apparatus wherein the same apparatus is directed to the safe, convenient and segregated handling of used oil filters and used oil from vehicular oil changes to promote recycling of same.

BACKGROUND—DESCRIPTION OF PRIOR ART

In recent years, the general public has become more aware of the benefits to the overall environment of recycling spent motor oil. Initially, used oil recycling was initiated to recover energy. Regardless, considerable amounts of spent oil not being recycled is being disposed of in a fashion that is injurious to the environment, specifically through groundwater and soil contamination. Thus, the emphasis of spent oil recycling has expanded from energy to include environmental concerns. Consequently, many products are on the market to capture, store and transport waste oil, particularly that oil generated by a do-it-yourself (DIY) oil changer. But, as environmental consciousness has heightened, other aspects of oil changes are now being addressed.

It is known that an individual used oil filter contains a residual amount of oil. That residual oil drains over time. Considering the amount of spent filters either disposed of improperly or landfilled, the collective amount of oil is considerable. In some states, it is now illegal (or soon will be) to dispose of used oil filters in municipal landfills. These states are attempting to find different ways to properly handle and recycle these used filters. Consequently, recycling of used oil filters is becoming a new industry. Curbside collection programs and community aggregation centers are being set up across the country. These programs are intended to make it as convenient as possible for DIY'ers to properly dispose of their used oil and filters, instead of illegal disposal.

Consequently, many used filters received from DIY-ers for recycling are received in paper filter boxes, plastic bags, or other throw away containers. In many cases, used oil itself is being returned in disposable containers. This presents another problem: handling and disposal of these throw-away containers. It is impossible to evacuate all of the waste oil from these containers without using a rag, or some sort of rinsate. This, in turn, produces more wastes. Thus, these disposable containers are contributing to the oily waste problem they are supposedly alleviating.

This inventor works in the oil filter recycling industry, and can foresee increasing problems in both the area of DIYer cooperation, due to inconvenience, as well as in the secondary waste streams generated. It occurred to the inventor that a reusable container was needed for the transport of the used filter. Better yet, what was needed was a device that would allow the filter to drain, while keeping the filter and oil drained from it separate during transport and evacuation of the drained oil. Finally, it was determined that the receptacle that received the filter's drained oil could also be configured to capture and store the oil from the vehicle's crankcase. In devising such an apparatus, this inventor developed an answer to the problem of disposable containers, and more importantly, to the problem of inconvenience to the user.

With this device, the DIYer can capture the oil drained from the engine, place the used filter in a draining mode, and seal everything in a single container, in one operation. The products currently on the market, and/or in the prior art, call for draining the filter for a period of time, then returning at the end of that period to prepare both the filter and receptacle for storage and transport. This inventor's device consolidates filter drainage and storage, thus eliminating a return trip.

As mentioned, search of prior art reveals that devices have been contrived for the capture, storage and eventual transport of used oil. But few of these devices provide for draining the used oil filter, and none allow for the transport of the filter in a way which keeps it separate from the oil that has drained from it.

Foremostly from an economic standpoint, Pollacco sets forward arguments for recycling oil, as well as the problems faced by the do-it-yourselfer (DIY) in both U.S. Pat. No. 4,533,042 (1985) and U.S. Pat. No. 4,403,692 (1983). He addresses the draining of the filter but not segregated storage and transport of the drained filter.

Other prior art, as well as commercial products on the market, show substantial advances in the area of capturing, storing and transporting used crankcase oil. U.S. Pat. No. 4,823,947 (1989) to Maynard, Jr.; U.S. Pat. No. 4,702,290 (1987) to Perez; and U.S. Pat. No. 4,974,647 (1990) to Eastom are further examples of prior art structures for receiving waste oil. The device set forth by Maynard, Jr. in U.S. Pat. No. 4,823,947 (1989) principally is devised for the collection of oil drained from the crankcase, but also allows for draining the oil filter. In one claim of the same patent, Maynard, Jr. states that the drainage opening is of size sufficient to allow the passage of an object the size of an oil filter into the storage cavity. This defeats the purpose of draining the filter, since it is re-introduced into the oil which was drained from it. Or, an additional device is needed for the filter. Even with this additional device, the filter would still be in its own residual oil.

The U.S. Pat. No. 4,702,290, (1987) to Perez sets forth a collection pan that allows oil collection from both the engine and a draining filter, which in turn allows transference of the collected used oil from the collection pan into household containers for easy transport. In U.S. Pat. No. 4,974,647 (1990) Eastom's device is similar to that of Perez' and Maynard's, in that it allows for the drainage of the filter, but no way allows storage or transport in a segregated fashion.

It is important that the filter be as free of internal, as well as external, residual oil when it is removed from its transport container. Transferring from a singular container to a bulk container can prove a messy task if the filter is coated with oil or has oil draining from it.

One other product, which Tupperware has on the market with patent pending, allows for the capture, storage and transport of used oil, all within the same apparatus. It also allows for the drainage of a used oil filter, but it does not provide for the storage or transport of the drained filter. This product is much like the previously mentioned device under U.S. Pat. No. 4,702,290 (1987) to Perez, without the control valve.

While some of these products take into account the drainage of the used oil filter, none allow for the clean, separate storage or transport of said drained filter.

In other related patents, U.S. Pat. No. 4,020,922 (1977) to Klasel sets forth an apparatus whereby a removed used oil filter is captured in a bag as it is removed from an engine which provides for the safe and clean removal of used oil filters. But this apparatus is primarily for the removal, not the drainage, storage or transport of said filter.

Other patents have been granted for devices that work as funnel and bag waste oil collectors, and kits whereby new oil and used oil are both furnished and received respectively by one apparatus. None of these devices allow for the clean transport of the filter.

At the time that the patents listed above were submitted, the major objective from both an ecological and economical standpoint was the capture and transport of used motor oil for recycling. Since that time, used oil filters have been added to the list of concerns. Consequently a convenient, environmentally and economically sound method of management of these filters is necessary. A reusable container such as my invention meets all of these criteria.

OBJECTS AND ADVANTAGES

As such, several objects and advantages of my invention are:
- (A) the convenient and clean removal of the used oil filter;
- (b) the drainage of said filter;
- (c) to allow for the capture of used oil directly from the engine oil pan;
- (d) to hold drained filter separate from drained and collected oil, thus keeping it clean;
- (e) the capacity to seal used filter and drained oil in one containment system immediately upon completing the oil change, thus eliminating the waiting period for the filter to drain and/or cool off;
- (f) and the means to safely, conveniently, and cleanly store and transport both drained used filter and oil to a recycling point; while
- (g) enabling the re-use of the apparatus, thus reducing oily waste from the wastestream.

While prior art allows for the collection, storage and transport of used oil, it does not allow for the clean, segregated storage and transport of the used oil filter, particularly in a reusable apparatus that also stores and transports the used oil collected from both the engine and spent filter. Further objects and advantages will become apparent from a consideration of the drawings and ensuing description.

SUMMARY

The present invention provides a convenient way for the do-it-yourself oil and filter changer to safely and cleanly drain the used oil from the oil filter; seal and store both filter and drained oil in the same container that crankcase oil is collected and stored in. In so doing, the invention keeps the drained filter separate from the drained and collected oil. It also eliminates the need for the DIY to return and attend to a drained filter, since this device allows for all of this to take place in one operation. At the time of disposal, the DIY need simply pick up the apparatus, with contents inside. In so doing, both used filter and oil can be transported to a local aggregation center for recycling, or can be used in a curbside collection program. The invention has the advantage of re-use time and again, thus reducing the need for disposing of oily bags, boxes, milk jugs, and other storage and transport wastes now currently adding to our landfill and water pollution problems. By allowing the DIY the convenience of using a sealed container for storage and transport of the used filter, as well as the used oil, the temptation of improper disposal is lessened. No waiting period is needed to allow the oil filter to drain before sealing it in the device. This one step operation will also help deter improper disposal. With the rigid reusable structure of the invention, several benefits are inherent over the current standard mode of operation. Subjection to heat does not adversely affect the invention as it would plastic bags or paper boxes. In addition, if the filter is mangled in some way in removal, leaving sharp edges or points, the filter container on the invention is less susceptible to punctures, tears, or cuts than conventional bags or boxes. The invention solves a problem that has recently become apparent as used oil filters have been labeled a culprit of land and water pollution. By allowing the do-it-yourselfer a convenient, safe, and clean means to manage used oil filters along with used oil, it checks the tendency to improperly dispose of these recyclable wastes.

DRAWING FIGURES

REFERENCE NUMERALS IN DRAWINGS OF THE PREFERRED EMBODIMENTS

| 20 | filter container | 22 | Filter container top |
| 24 | filter container cylinder | 26 | filter container male flange |
| 28 | vent spout | 30 | filter cushioning |

-continued

| 32 | vent cap | 34 | spring sleeve vent cap retainer |
|---|---|---|---|
| 36 | filter container handle | 38 | drain lid |
| 40 | circular cover plate | 42 | filter container female flange |
| 44 | filter support drain plate | 46 | drainage opening slot |
| 48 | drainage diverter plate | 50 | lid tightening lugs |
| 52 | drain lid female flange | 54 | oil collection tank |
| 56 | oil tank upper member | 58 | oil tank lower member |
| 60 | oil tank back wall | 62 | oil tank side walls |
| 64 | oil tank front wall | 66 | pour off truncation |
| 68 | drain lid male flange | 70 | oil tank drain opening |
| 72 | pour spout | 74 | pour spout cap |
| 76 | gasket | 78 | oil tank back handle |
| 80 | back handle anchor | 82 | oil tank front handle |
| 84 | filter cont. shoulder | 86 | filter cont. seal lip |
| 88 | oil tank seal lip | 90 | oil tank seal shoulder |

DETAILED DESCRIPTION OF THE PRESENTLY PREFERRED EMBODIMENT

Figure 1:
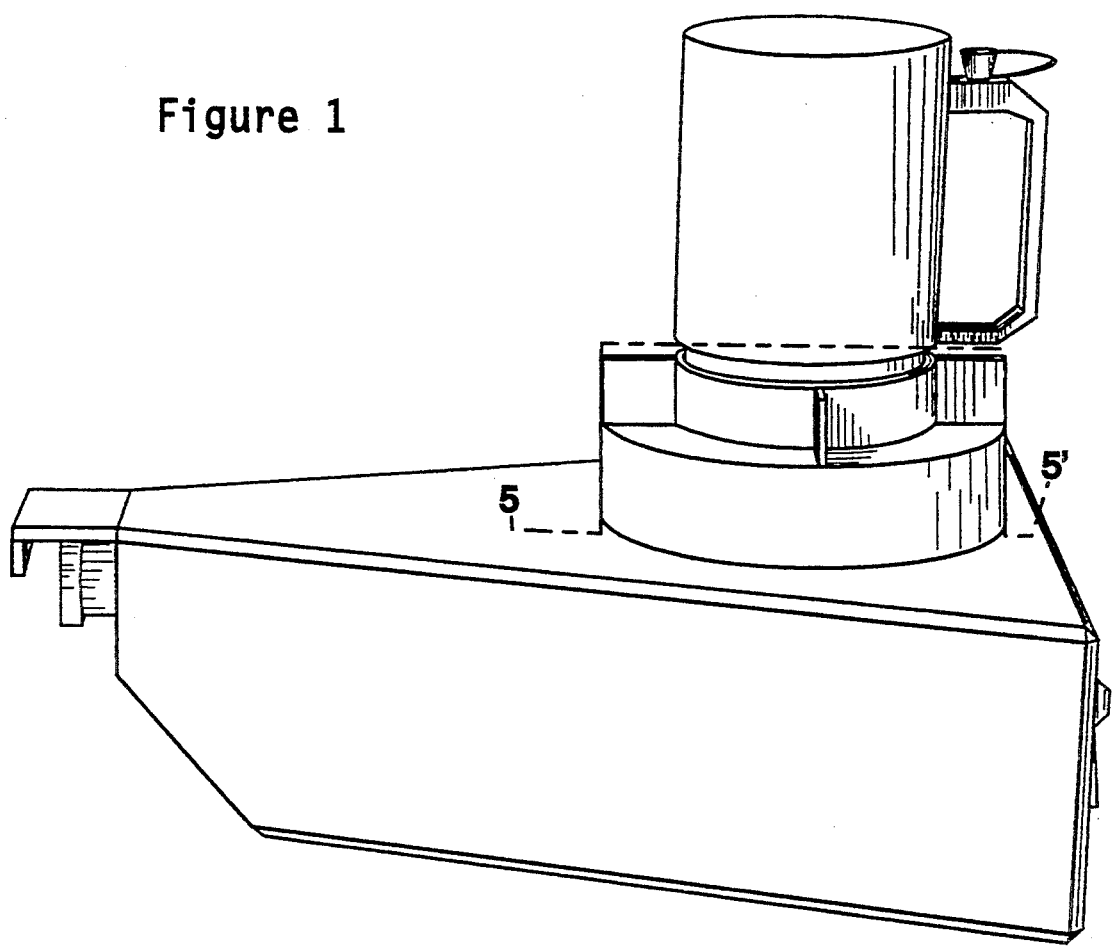
FIGS. 1 and 2 are perspective views of the preferred embodiment, side view and front view.
Figure 2:
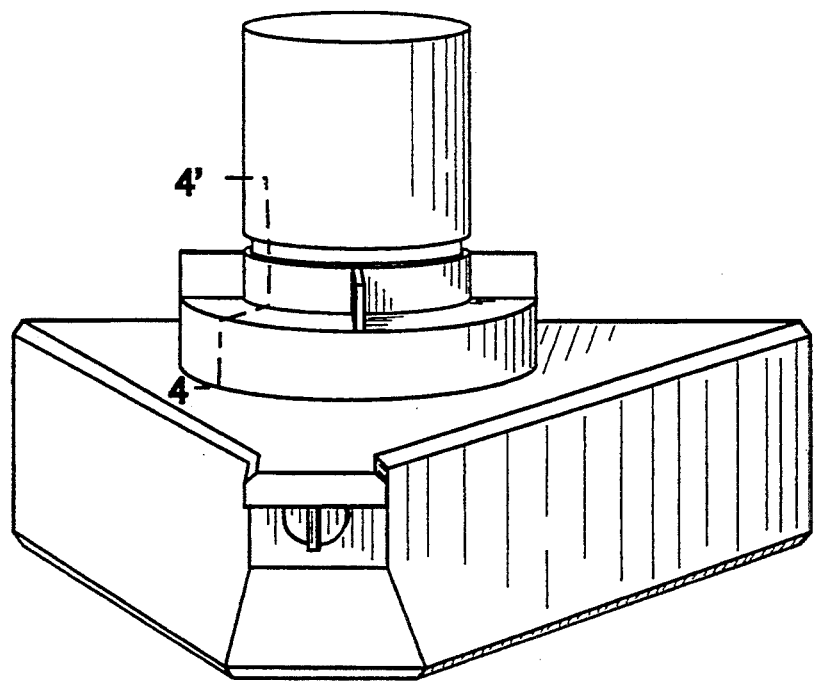
Figure 3:
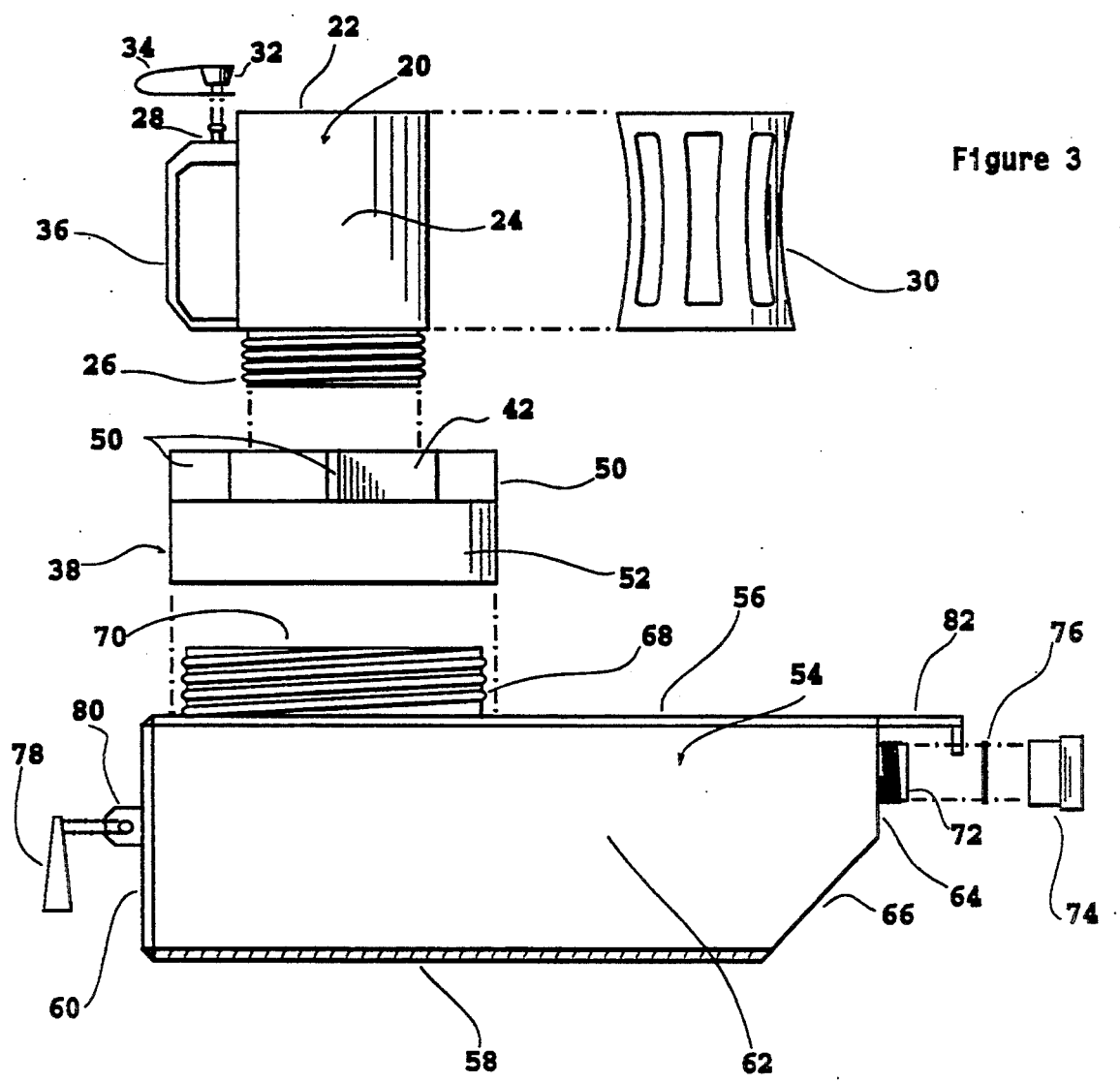
FIG. 3 is an exploded side view of the preferred embodiment.

FIGS. 1 and 2 show perspective views, side and front of the preferred embodiment of my invention, a used oil filter and oil recycling apparatus. This reuseable device consists of three major components. The first component is a filter container 20 and its subcomponents. The second component is a dual purpose drain lid 38 and its subcomponents. The third major component is an oil collection receptacle, or tank, 54 and its subcomponents. FIG. 3 shows an exploded side elevational view of the apparatus. Filter container 20 and oil collection tank 54 are joined to drain lid 38 by flanges on both the upper and lower side of drain lid 38. Filter container 20 is joined to drain lid 38 by means of a threaded connection between a filter container male flange 26 and a filter container female flange 42. Tank 54 is joined to drain lid 38 by means of a threaded connection between a drain lid male flange 68 and a drain lid female flange 52.

FILTER CONTAINER

Figure 4:
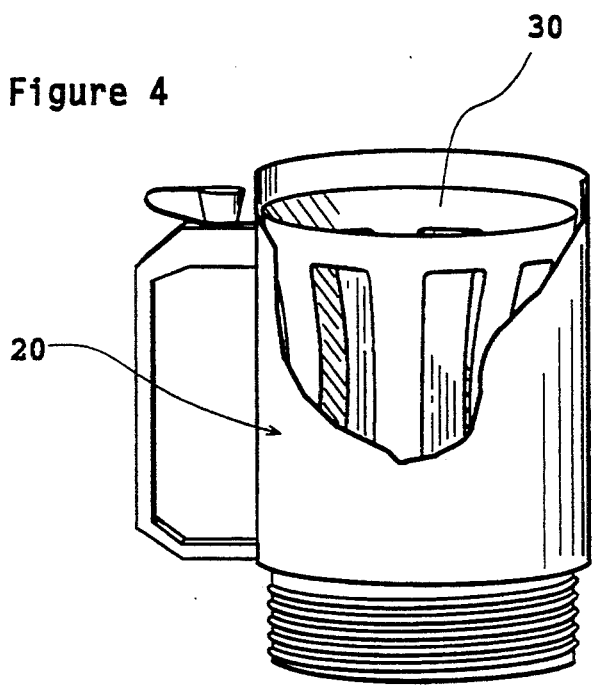
FIG. 4 is a cut-away perspective view of the filter container.

As seen in FIGS. 3 & 4 the basic shape of filter container 20 is formed by a circular plate which serves as container top 22 with a cylindrical sidewall 24 extending downward from its perimeter. Filter container 20 is open at the bottom. Other subcomponents illustrated in FIG. 3, which are integral or attached to filter container 20 consist of a vent spout 28, a vent cap 32, a vent cap retainer 34, a filter container handle 36, and a filter cushioning and retaining spring sleeve, or sleeve 30. Further, as shown in FIG. 3, filter container male flange 26 is molded into the bottom of the cylindrical wall on filter container 20.

As seen in FIG. 4, handle 36 is rigidly molded, top to bottom, as part of the body of filter container 20. An air cavity in the top of handle 36 allows for the passage of vent air from inside the body of container 20 through to vent spout 28. Handle 36 begins sufficiently below the top of filter container 20 to allow clearance for vent spout 28 and vent cap 32. Vent spout 28 is molded into the top of handle 36, as shown in FIG. 4, to allow filter container 20 to be inverted and stand on its top. Vent spout 28 is a cylindrical spout rising from the top of handle 36. As seen in FIG. 3, enough room is allowed around spout 28 to accommodate vent cap 32. Vent cap 32 is a snap cap with vent cap retainer 34 molded to it. With vent cap 32 in place on vent spout 28, top of vent cap 28 will not protrude above or beyond filter container top 22. As seen in FIG. 3, vent cap 32 is secured to vent spout 28 by a snap-on tension connection. Retainer 34 consists of a flat strip of plastic terminated on one end by vent cap 32, and on the other end by a flat plastic loop that encircles vent spout 28.

The height and width of filter container 20 is of a size necessary to accommodate a used oil filter. Whereas oil filter sizes vary in height and diameter, more than one size of filter container 20 is feasible.

Figure 5:
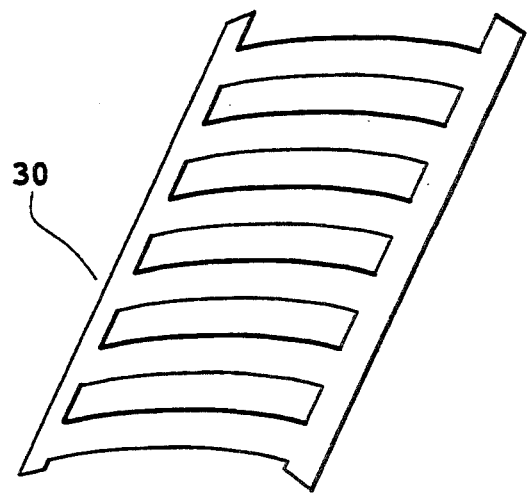
FIG. 5 is a perspective view of the spring sleeve in the uncoiled state.
Figure 6:
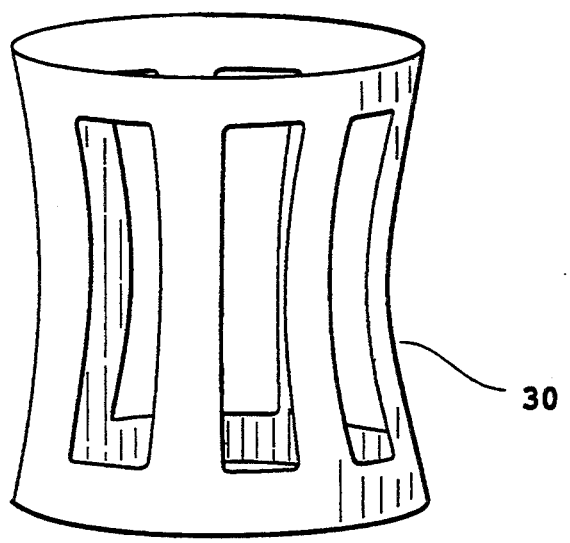
FIG. 6 is a perspective view of the filter cushioning and retaining spring sleeve.

As shown in FIG. 4, inside of filter container 20 is filter cushioning and retaining spring sleeve 30. FIG. 5 illustrates that sleeve 30 is formed as one solid piece. Sleeve 30 is rectangular in shape with rectangular voids cut out of it at regular intervals, leaving a top and bottom strap connected by a series of spring legs. This piece is molded as a curve with the curve running longitudinally along the spring legs. After being cut to fit, spring sleeve 30 is rolled into a cylinder with the top and bottom straps at opposite ends, as seen in FIG. 6. This sleeve is inserted into filter container 20 and allowed to expand. The tension of this expansion keeps sleeve 30 in place above the filter container male flange 26.

Drain Lid

Figure 7:
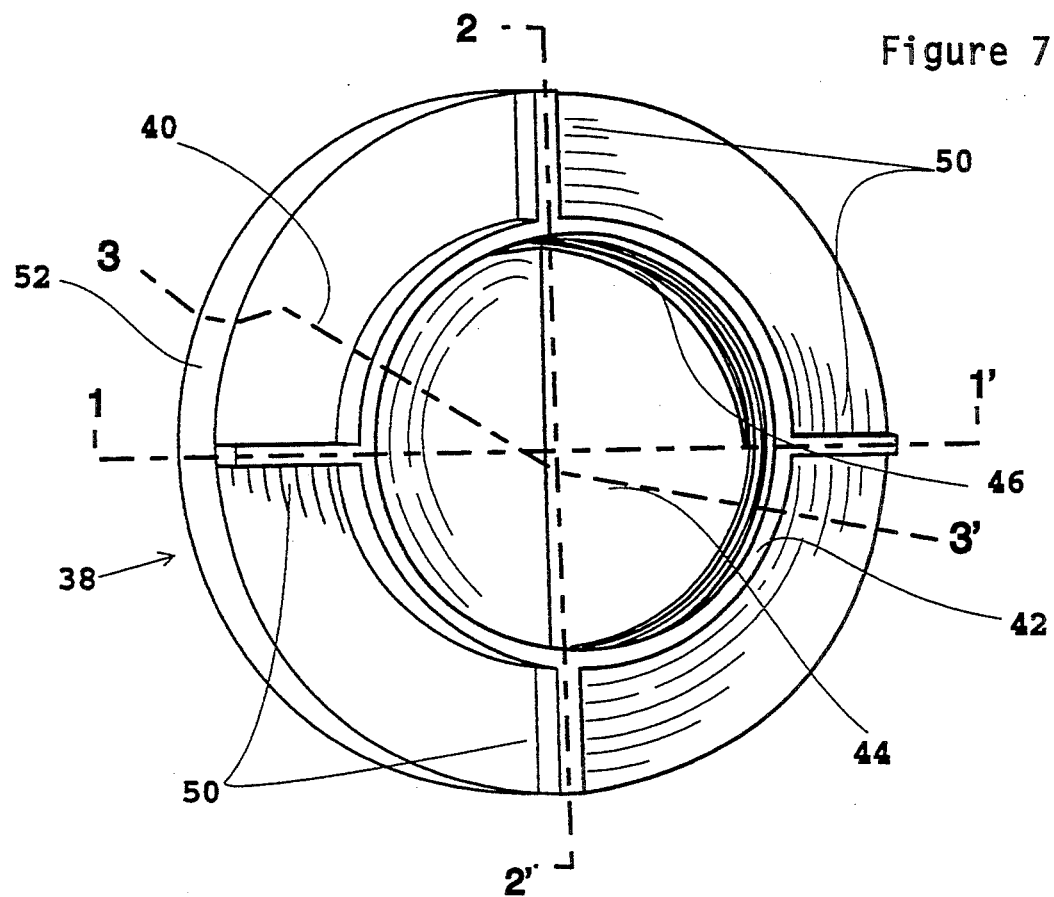
FIG. 7 is a perspective view of the drain lid.
Figure 7A:
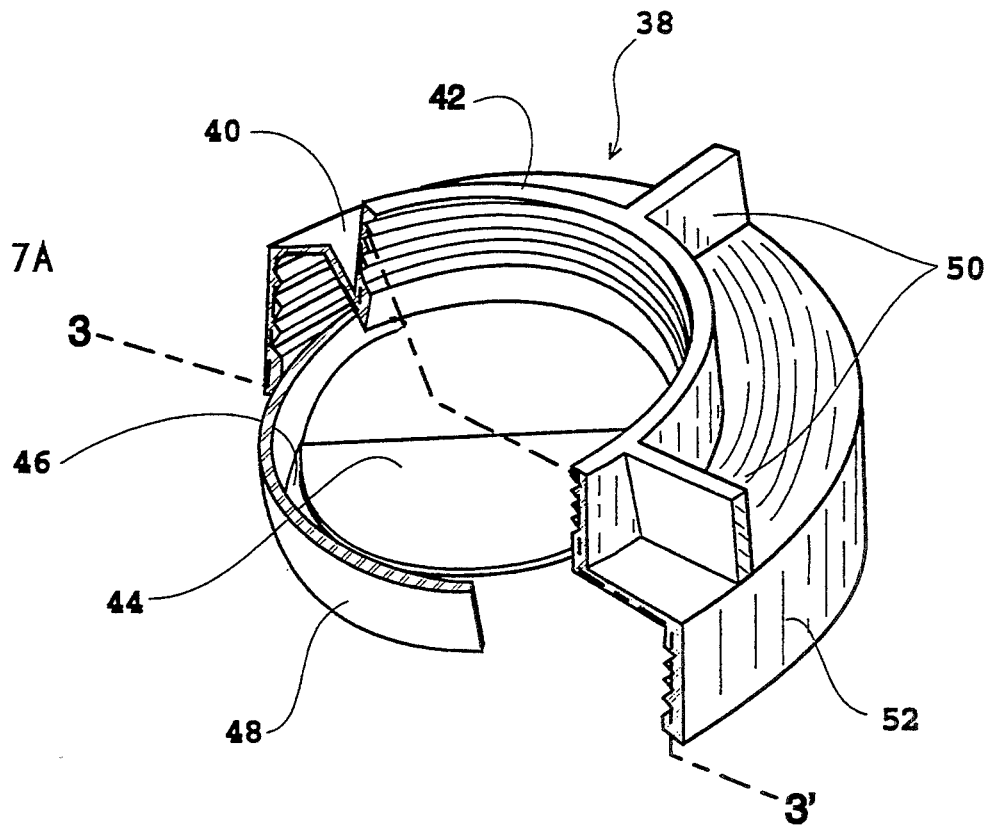
FIG. 7A is a perspective view of the drain device partially cut-away.

The dual purpose drain lid, or drain lid, 38 is illustrated in perspective top view in FIG. 7, and in perspective side view partially cut-away in FIG. 7A. It also is shown in side elevation cross section view in FIG. 8 along section line A-A' from FIG. 7, and side elevation cross section view in FIG. 9 along section line B-B' from FIG. 7.

As best seen in FIG. 7A, drain lid 38 consists of a flat circular cover plate 40 with diameter sufficient to cover an oil collection tank drain opening 70; an oil tank lid female flange 52; a filter container female flange 42; a filter support drain plate 44; a drainage opening slot 46; a set of four lid tightening lugs 50; and a drainage diverter plate 48. FIG. 7A best illustrates lugs 50.

Figure 8:
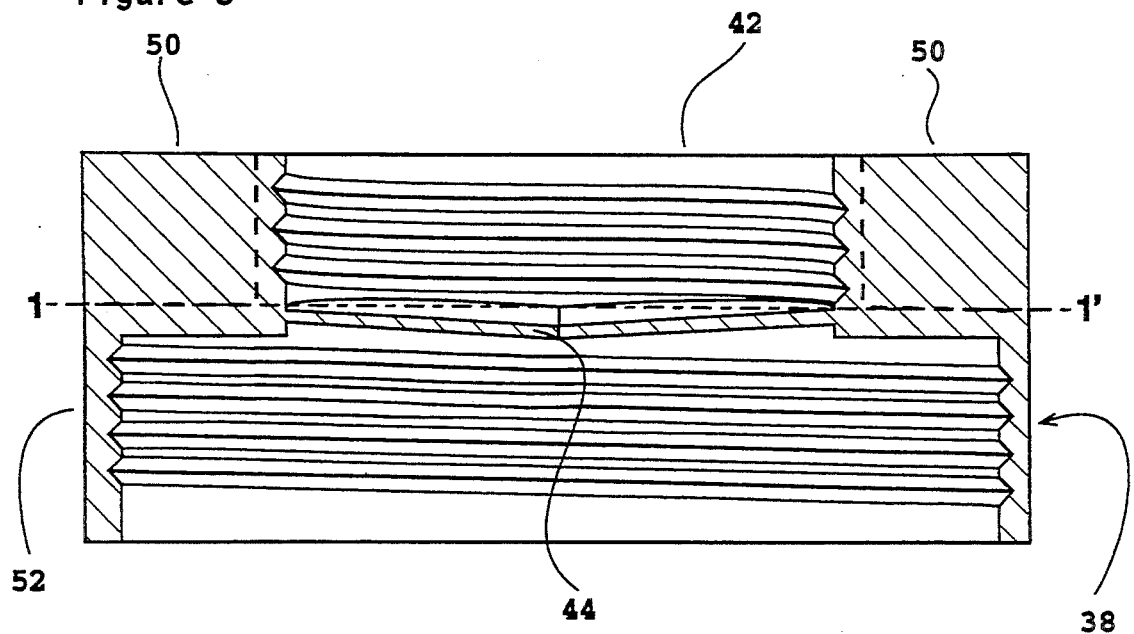
FIG. 8 is a side elevational cross section view taken along line A-A' of FIG. 7.
Figure 9:
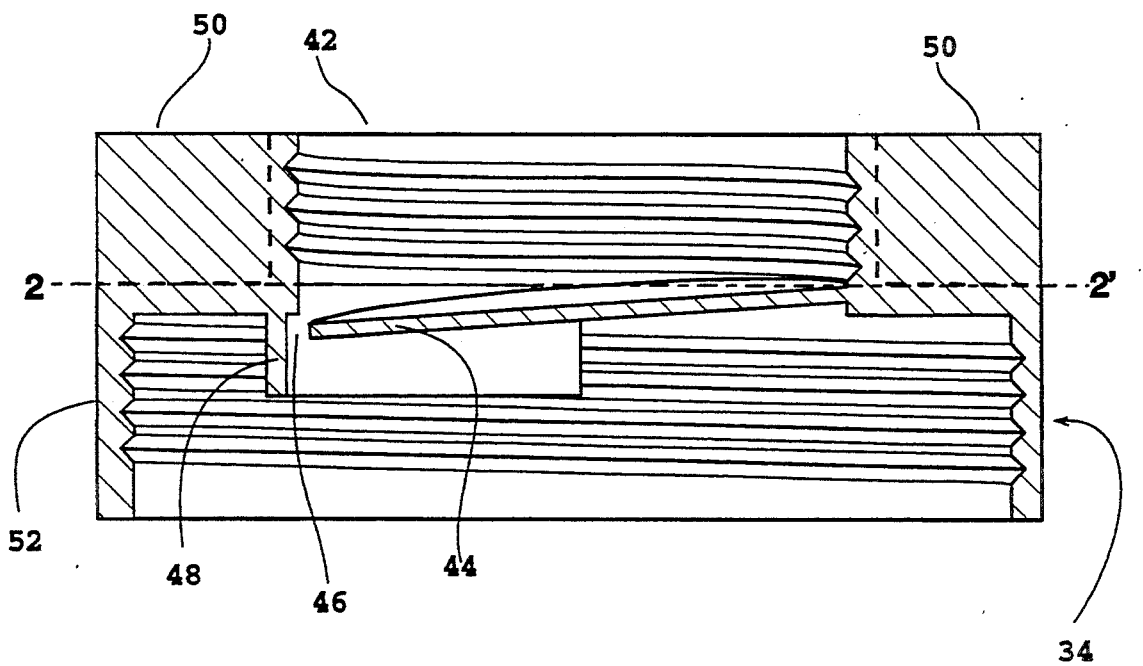
FIG. 9 is a side elevational cross section view taken along line B-B' of FIG. 7.

As seen in FIGS. 8 and 9, extending downward from the bottom side of plate 40 at its circumference is oil tank female flange 52 which mates correspondingly with its counterpart, an oil tank male flange 68 which is a molded part of tank 54. Centered in and extending upward from the topside of plate 40 is filter container female flange 42. Flange 42 matches its counterpart filter container male flange 26. Both sets of flanges are joined in a threaded fashion.

FIG. 8 and 9 illustrate that flange 42 is a collar which is open at the top and has filter support drain plate 44 as a bottom. As seen in FIG. 7A, the bottom of flange 42 is attached to the center of circular plate 40. On the opposite side of plate 40 and centered under flange 42 is drain plate 44. Drain plate 44 begins flush with the underside of circular plate 36, and angles downward, away frets the underside of plate 36. Drain plate 44 is attached rigidly to plate 40 with the exception of drainage opening slot 46. Drainage opening slot 46 is formed by the void created where drain plate 44 separates from the underside of circular plate 40. FIG. 8 illustrates that drain plate 44 is formed in a vee shape, with the bottom of the vee centered in the middle of drain plate 44. This vee is pointing down away from underside of plate 36. Drain slot 46 is centered around the point where drain plate 44 is furthest from circular plate 40. The opening of slot 46 is sufficient to allow for adequate oil drainage from an oil filter. FIG. 9 illustrates the placement of drainage diverter plate 48, which is mounted transversely to drainage opening slot 46 on the underside of circular plate 40. This diverter plate is placed within sufficient proximity of drainage opening slot 46 to allow for sufficient drainage while diverting drained oil down. The diverter plate is curved to match the curvature of drain plate 44.

As seen in FIG. 7, drain lid 38 has four equally spaced lid tightening lugs 50 molded into its upper surface of sufficient size to assist in tightening and loosening of drain lid 38. Lugs 50 extend radially from the sides of flange 42 outward to the edge of plate 40. The height of lugs 50 is equal to that of flange 42, and is consistent to the edge of plate 40.

Oil Collection Tank

Figure 10:
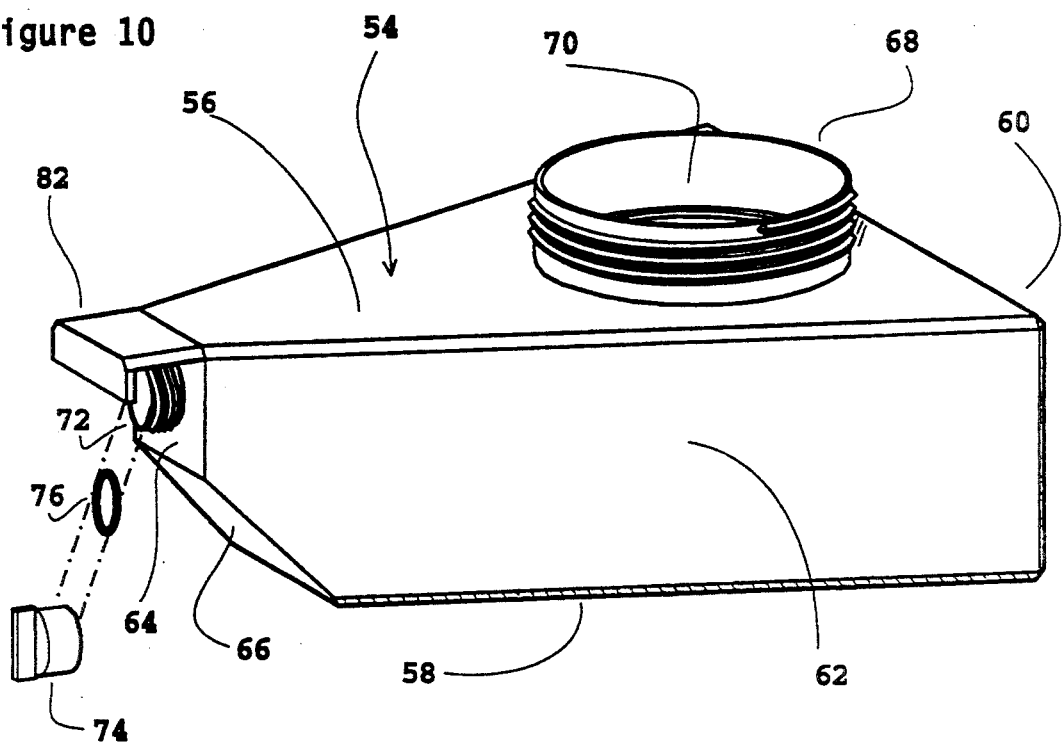
FIG. 10 is a perspective view of the pour spout, pour spout lid, front handle, truncated end, and tank body.

The third major component is tank 54, an oil collection receptacle. It is illustrated in FIGS. 3 & 10. Its subcomponents are: drain lid male flange 68; oil tank drain opening 70; a pour spout 72; a pour spout cap 74; a pour spout lid gasket, or gasket, 76; an oil tank back handle 78; a back handle attachment, or anchor, 80; and an oil tank front handle 82.

As seen in FIG. 10, tank 54 consists substantially of 7 sides. These sides are: an oil tank upper member 56, an oil tank bottom member 58, an oil tank back wall 60, an oil tank front wall 64, a pair of oil tank side walls 62, and an oil pour off truncation 66 located below front wall 64. Upper member 56 and bottom member 58 are parallel. Extending perindicular, and connecting these members are side walls 62 and back wall 60. Parallel to back wall 60, front wall 64 extends downward from the front edge of upper member 56 to enjoin side walls 62 and pour off truncation 66. Pour off truncation 66 completes the sides of the tank body. Truncation 66 extends from the bottom of front wall 64 at a forty-five degree angle towards back wall 60, joining into side walls 62 and bottom member 58. Front wall 64 is one-third the width of back wall 60. This produces a tank body of triangular shape, with a double truncation at one point of the triangle.

As seen in FIG. 10, oil pour spout 72 is centered in oil tank front wall 64 and extends outward, away from the body of tank 54. Oil pour spout 72 has a set of external threads. As further seen in FIG. 10, drain opening 70 is centered in the middle of upper member 56. To further define its location, drain opening 70 is located distally from oil pour spout 72, while still allowing sufficient space from the rear wall to allow for seating of drain lid/oil tank flanges 52 and 68. Drain lid male flange 68 extends upward away from upper member 56, with threads around its outer surface.

Front handle 82 is an extension of upper member 56. It is a solid piece molded as part of tank 54. Handle 82 extends perpendicular to front wall 64. The thickness and strength of the upper plate, or front handle 82 is adequate to withstand lifting the device. The leading edge of front handle 82 extends beyond pour spout 72 an adequate distance to allow clearance for a handgrip during movement. Front handle 82 has a downward protruding lip extending from it of length and thickness necessary to provide additional horizontal control during a vertical lift of the device, but not protruding so much as to block pour spout 72 during the pour off operation. This handle is designed to provide assistance for vertical lifting of the device, while discouraging carrying the device with pour spout 72 in a position higher than the rest of the device.

As seen in FIG. 10, the outside of spout 72 is threaded to accept a screw-on pour spout cap 74. Cap 74 is plastic and accomodates a gasket 76 which forms a seal between cap 74 and spout 72. Spout 72 has an interior diameter sufficient to allow the free flow of poured oil. Tip of spout 72 with cap 74 secured does not extend beyond the outer limits of front handle 82.

Figure 11:
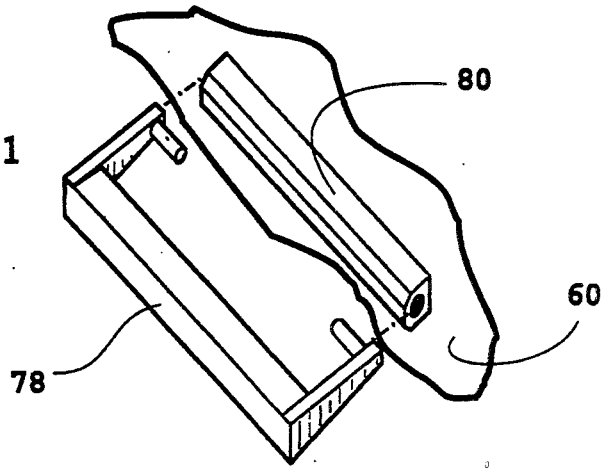
FIG. 11 is a perspective view of the oil tank handle and handle anchor in exploded form.
Figure 11A:
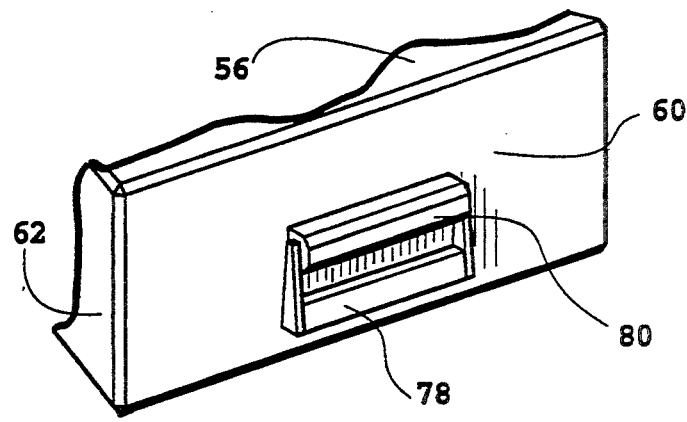
FIG. 11A is a perspective view of the oil tank handle and handle anchor.

As seen in FIG. 11A, back handle anchor 80 is centered top to bottom and end to end on back wall 60. Handle anchor 80 is molded rigidly onto tank 54 so as to protrude from back wall 60. As illustrated in FIG. 11 handle anchor 80 has a single pivot hole molded into the center of each end. These holes run parallel to back wall 60, and act as receivers for partner pins on oil tank back handle, 78. As illustrated in FIG. 11, handle 78 is formed similar to a briefcase, or suitcase handle. As seen in FIG. 11A, it pivots in handle anchor 80. Handle 78 is molded as a one piece unit and springs to allow for pins on handle 78 to mate with holes on anchor 80.

Tank 54 has a volume of 8 US quarts. This allows for 5 US quarts of oil plus headroom. As previously stated, different vehicles have different sizes of filters and oil capacities. So being, the size of tank 54 is arbitrary.

Figure 12:
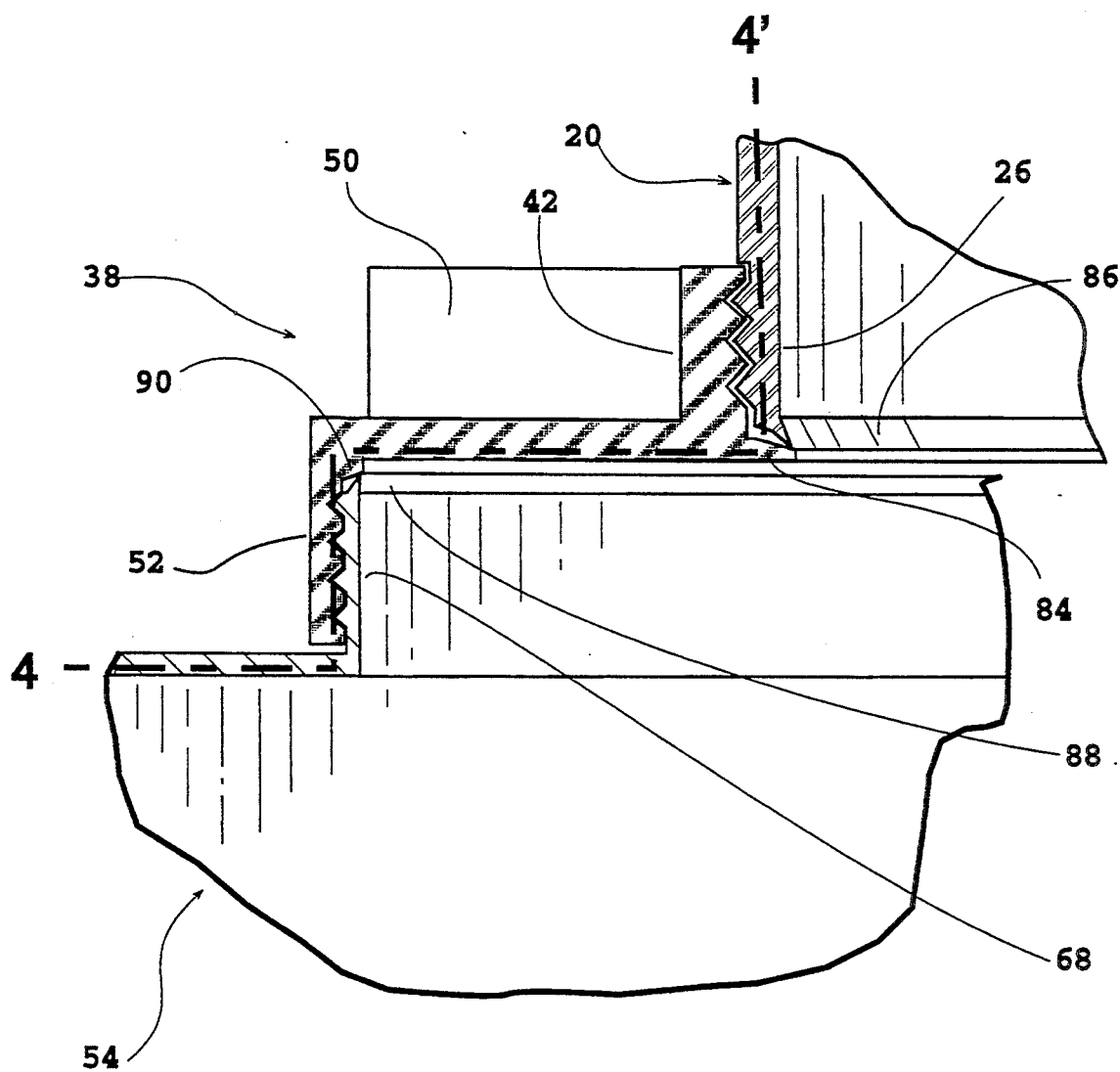
FIG. 12 is a cross sectional of the drain lid along line C-C' of FIG. 2.

FIG. 12 is a cross-sectional view illustrating the sealing means of the two flange connections. The upper flange connection in FIG. 12 is between filter container 20 and drain lid 38. The lower flange connection is between tank 54 and drain lid 38. On the leading edge of filter container male flange 26 is a filter container seal lip, or lip, 86. As the threaded closure is tightened, lip 86 comes in contact with a beveled filter container shoulder 84. When the seal is complete, lip 86 is in tension against the beveled shoulder forming an oil tight seal.

Likewise, molded onto the leading edge of oil tank lid male flange 68 is a oil tank seal lip 88. As the connection is made screwing drain lid 38 onto oil tank 54, seal lip 88 contacts a beveled oil tank seal shoulder 90 located at the top of oil tank female flange 52. When the connection is completed, lip 88 is held in tension against shoulder 90 forming an oil tight seal. All seal lips and shoulders are molded as part of their respective parent members.

When the connections of both flange sets are properly made up, drainage opening slot 46 is centered 180 degrees away from oil pour spout 72. Alignment arrows are molded into filter container 20, drain lid 38, and tank 54 to aid the user in determining proper closure. Also molded into the top of tank 84 are instructions for use of the apparatus. All components of the apparatus are formed of inexpensive yet durable polymer materials which are non-reactive to petroleum products. These polymer materials can be worked by conventional molding techniques to provide the desired configurations and dimensions.

Method of Operation

The method of operation is illustrated in FIGS. 13-16.

Figure 13:
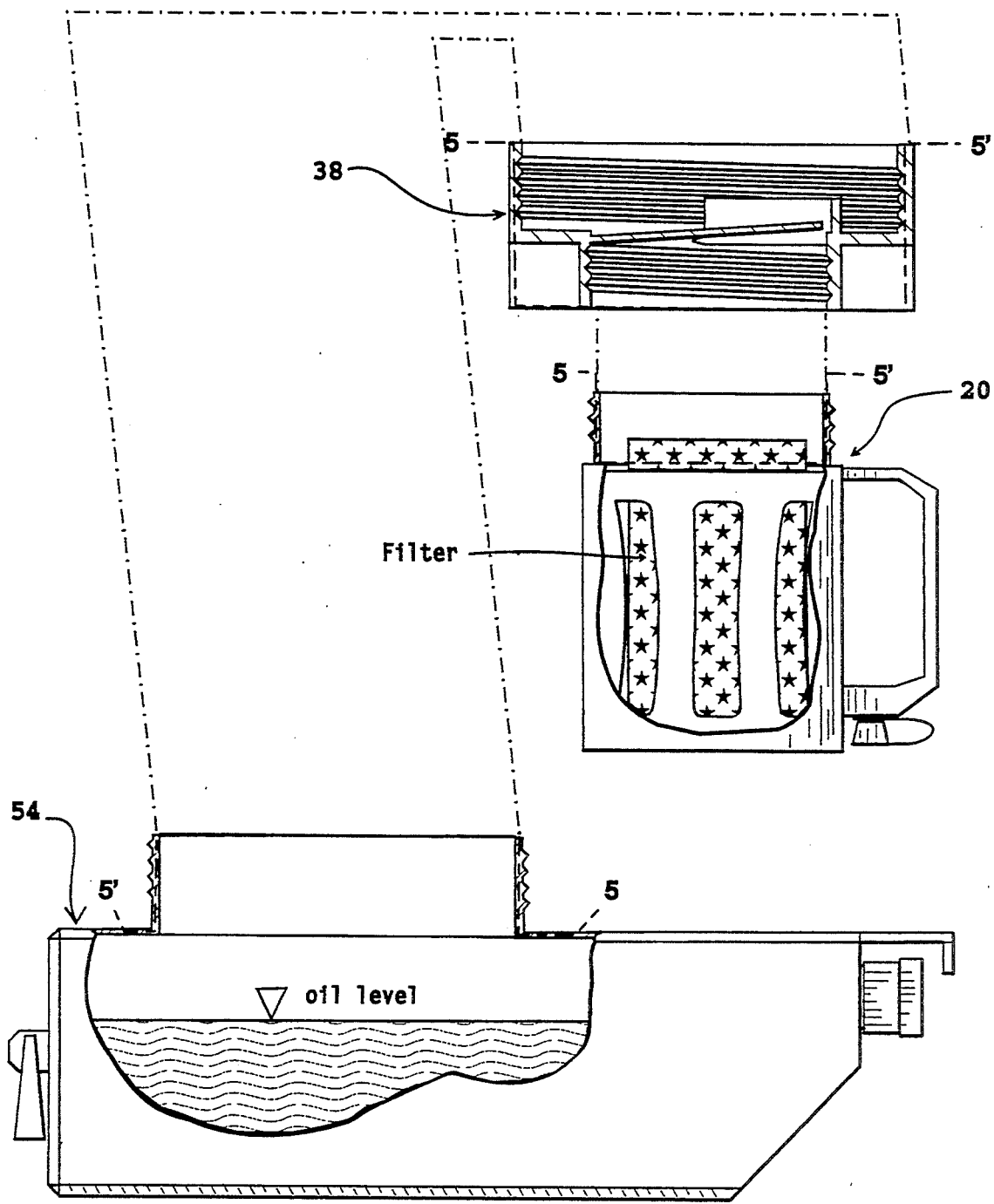
FIG. 13 is a side view of filter in container with drain lid being attached.
Figure 14:
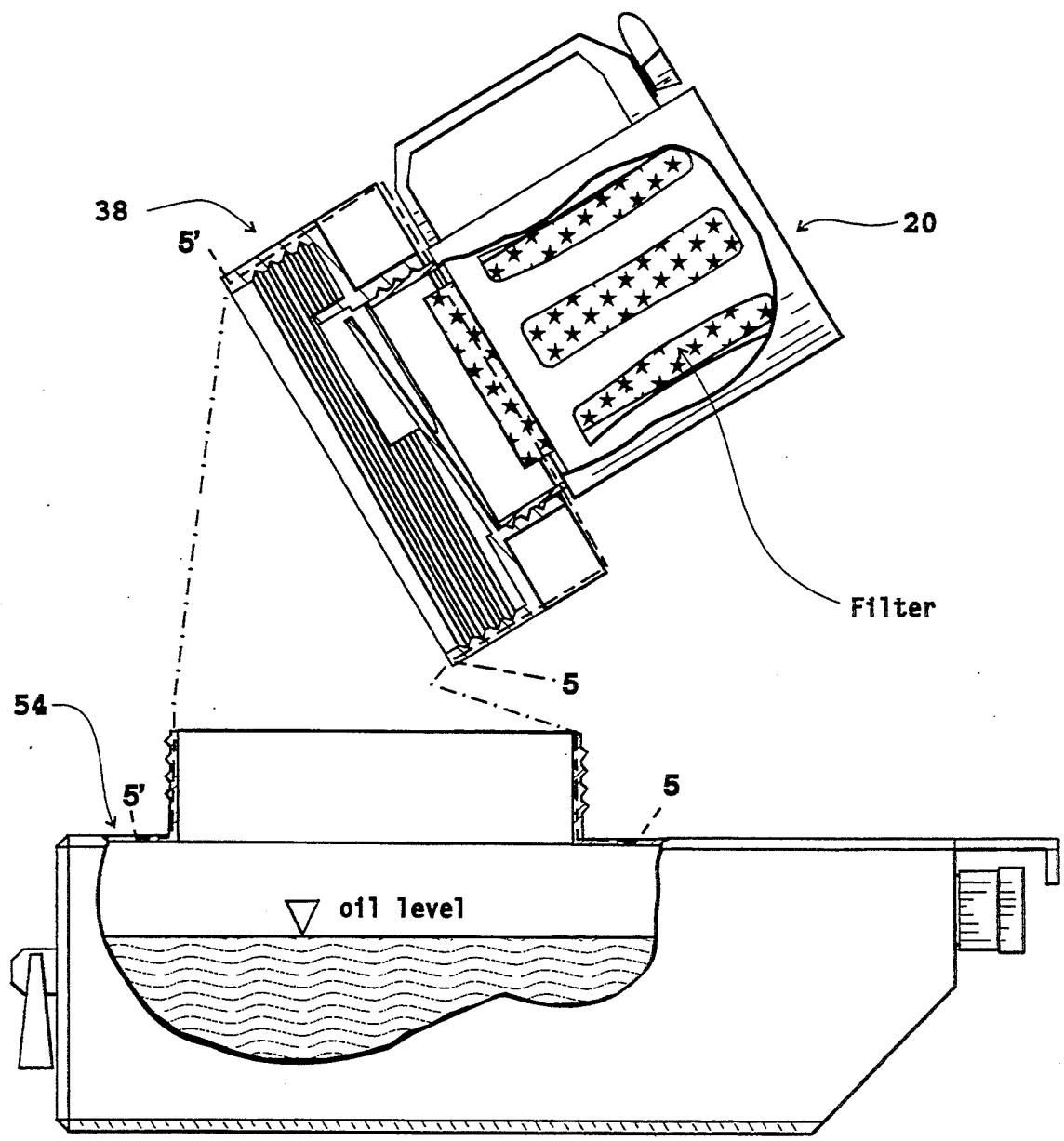
FIG. 14 is a side view of the filter container and drain lid being inverted by rotation with filter inside.
Figure 15:
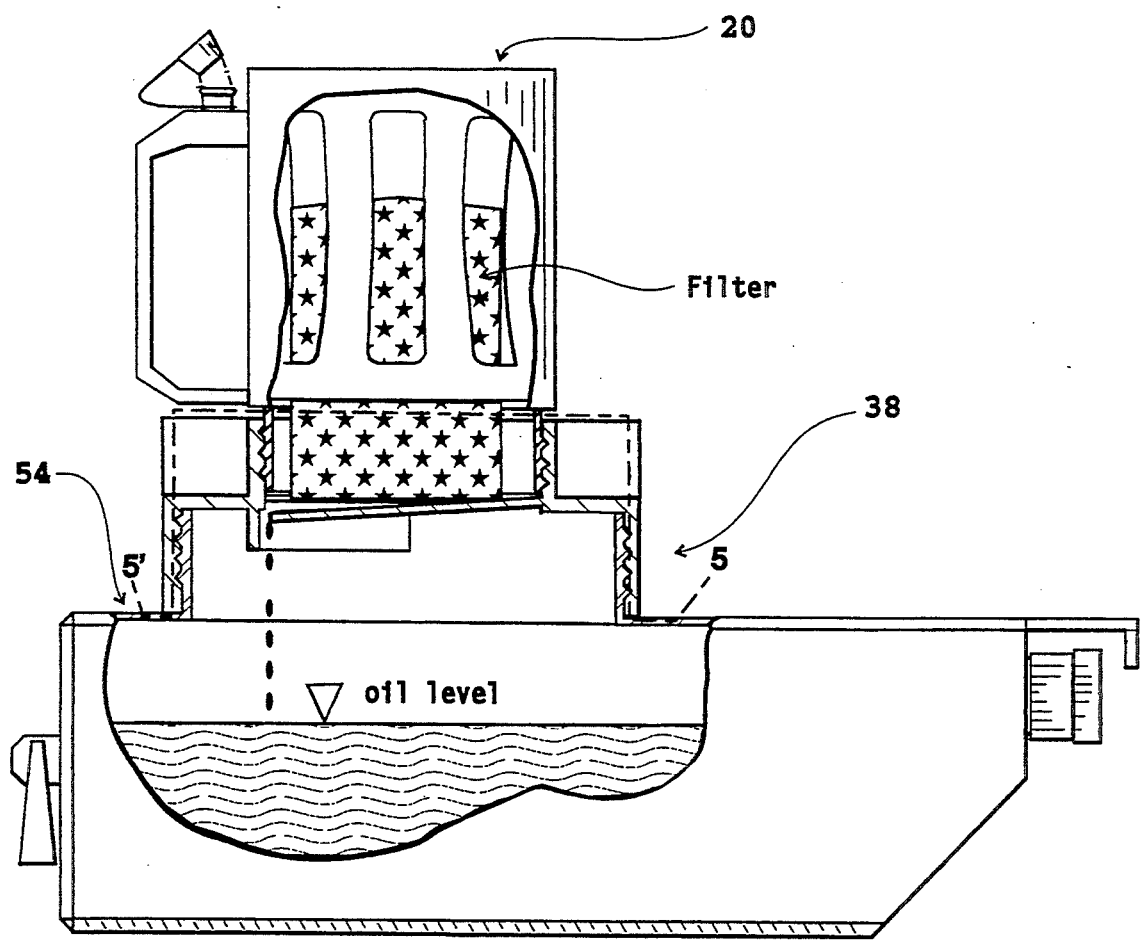
FIG. 15 is a side view of filter draining into oil tank.
Figure 16:
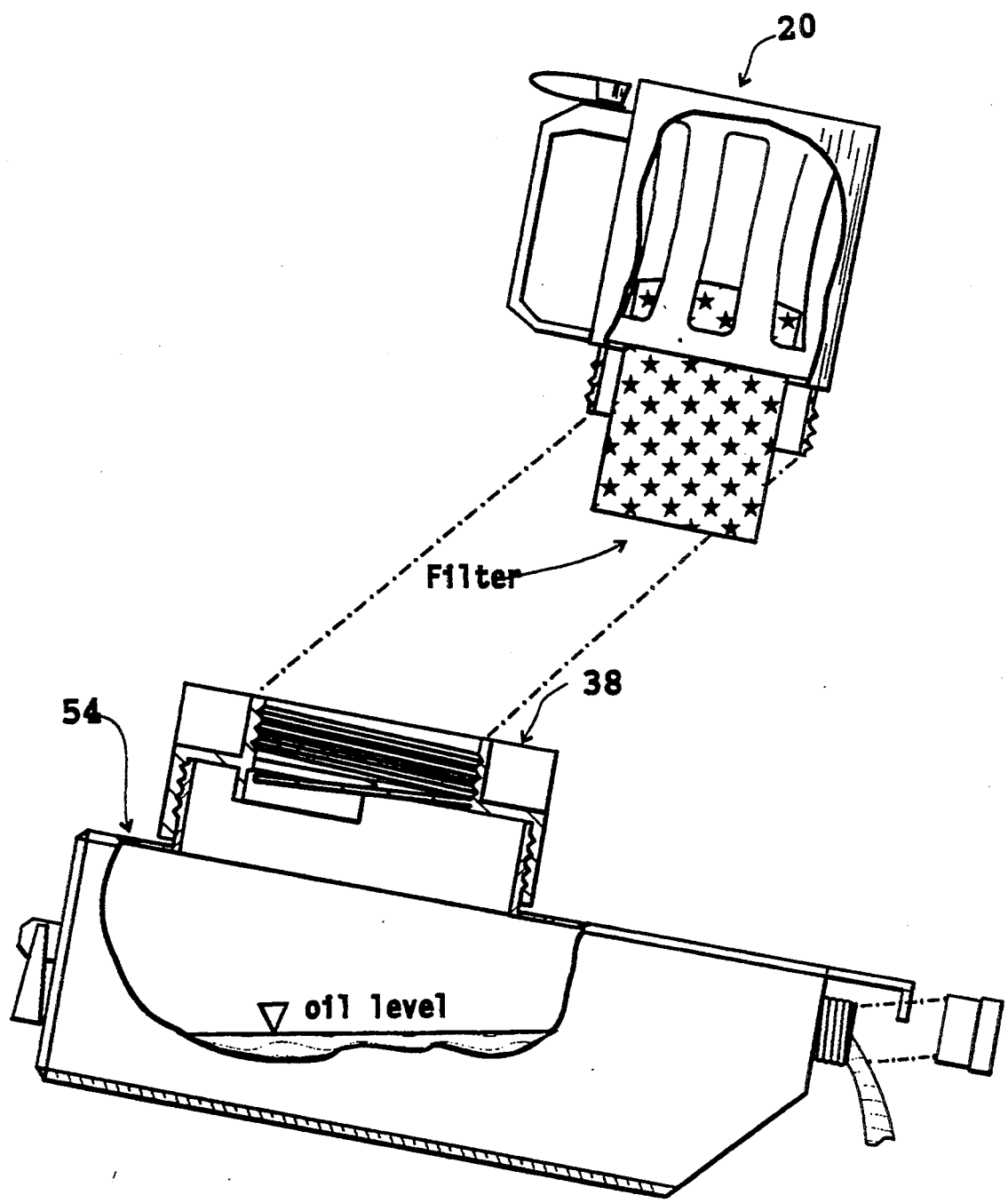
FIG. 16 is a side view of pouring off the oil and filter removal.

FIG. 13:
a.) Drain lid 38 is removed with filter container 20 intact from oil tank 54.
b.) Filter container 20 is removed from drain lid 38.
c. Ensuring that vent cap 32 is properly seated, filter container 20 is inverted and rested on its top.
d.) Tank 54 is placed under oil pan drain plug.
e.) Oil plug is removed from vehicle oil pan and oil is allowed to drain into tank 54 through opening 70.
f.) Oil filter is loosened from its mounting, while holding filter container 20 inverted underneath the filter.

g.) Once filter is removed it is placed in filter container 20, with its base plate facing the opening of filter container 20. In the event that the filter is accidentally dropped, instead of placed into filter container 20, filter cushioning sleeve 30 will soften its fall, thus reducing spillage.

h.) filter container 20 can now be rested on its top.

i.) After oil has been drained from engine, and oil pan plug is re installed, then tank 54 is removed from under the engine.

j.) Drain lid 38 is now inverted and screwed onto filter container 20. Flange 26 and flange 42 form an oil tight seal.

FIG. 14:

k.) Drain lid 38, with filter container 20 intact, is placed over oil tank drain opening 70, then rotated back into an upright position, keeping drainage slot 46 and drainage diverter plate 48 at the top of the rotation, or opening slot 46 facing upward and over tank opening 70 throughout the rotation. Drainage diverter plate 48 is placed in front of drainage opening slot 46 in such a way as to guide any drained oil into tank opening 70. With vent spout 28 sealed with cap 32, a vacuum effect will be maintained on the oil in filter container 20, thus reducing the amount of oil flowing from the opening during rotation. Once rotated back into its upright position, drain lid 38 is screwed onto oil tank 54 by means of threads on flanges 52 and 68. This will provide an oil tight seal between drain lid 38 and tank 54. Threads of flanges 26, 42, 52 and 68 are constructed in such a way that once the seals are properly made between filter container 20, drain lid 38 and tank 54, the drainage opening slot 46 faces away from tank pour spout 72.

FIG. 15:

l.) Vent cap 32 is now opened to release vacuum and used oil from the filter is allowed to drain through drainage opening slot 46 into tank 54. Filter support drain plate 44 is vee shaped to allow filter to drain more completely by creating a void between the center of the filter base and the bottom of the vee in plate 44. Filter should be allowed to drain for a minimum of 24 hours.

m.) Vent cap 32 is now re-sealed.

n.) Ensuring that all seals are tight, vent cap 32 and pour spout cap 74 are sealed, the total apparatus can then be picked up and carried to a used oil filter and used oil collection center by back handle 78 and front handle 82 on tank 54. The device can be carried with one hand by using back handle 78. Front handle 82 is primarily used to facilitate pouring operation and lifting the device in an upright position. The protrusion of back handle anchor 80 from the back of the device eliminates the possibility of storing the device on its back wall with pour spout 72 pointing up. Storage in this position with tank 54 containing oil would allow oil to re-enter filter container 20 thus contaminating the drained filter. Filter cushioning spring sleeve 30 acts as a buffer in filter container 20 to reduce movement of filter during transport. Sleeve 30 also acts to keep stored filter in an upright position.

FIG. 16:

o.) At the collection center, filter container 20 is removed and filter taken out.

Pour spout cap 74 is then removed and tank 54 is tilted to allow used oil to evacuate tank 54. Drainage opening slot 46 in drain lid 38 acts to vent tank 54 as oil is being evacuated. With drainage opening slot 46 facing 180 degrees from pour spout 72, the used oil level will not reach high enough to exit through drainage opening slot 46 unless tank 54 is raised too perpendicular too quickly, which will affect the quality of the pour. Pour off truncation 66 signifies the correct angle of pour, and can be used as a resting point during pouring.

q.) Once the filter and oil are removed, then filter container 20 is reattached to drain lid 38 and pour spout cap 74 is replaced on pour spout 72. The unit is now ready to be used again.

Second Embodiment

Figure 17:
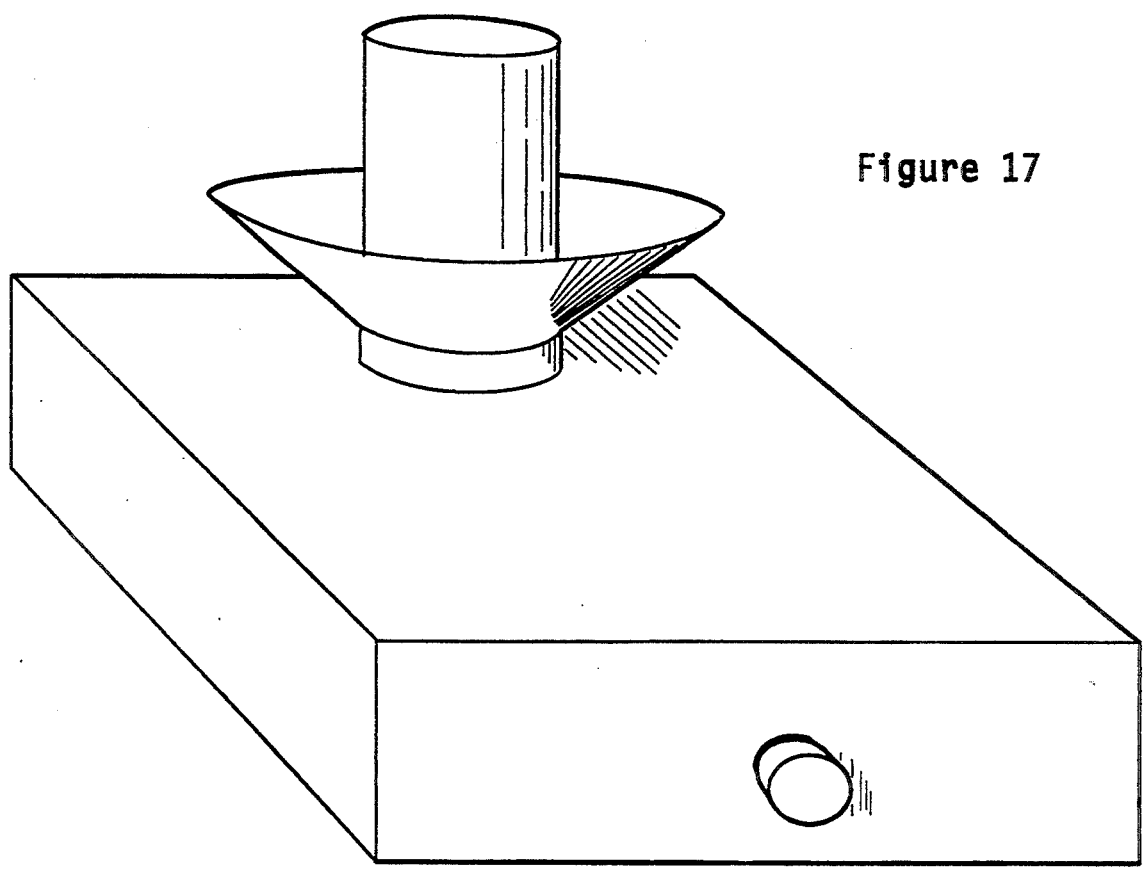
FIG. 17 is a perspective view of a second embodiment of the basic apparatus.

A second embodiment of the invention that achieves almost the same results is illustrated in FIG. 17. The basics of the oil tank are virtually redundant, with the exception of the size of the oil tank drain opening. This opening is smaller than the one used in the preferred embodiment. It is large enough to accept the filter container, thereby eliminating the need for the drain lid. In order for this embodiment to be practical though, a funnel will be necessary to increase the catch area for the draining crankcase oil. In this second embodiment the funnel is molded as an extension of the female flange built into tile oil tank. This funnel could be removable as well, threading into and out of the female flange. The filter container would be inverted directly into the female flange, making the screen at the bottom of the oil tank drain opening necessary for support of the draining filter. This embodiment eliminates the drain lid of the preferred embodiment.

Ramifications of Second Embodiment

Several drawbacks are evident with study of this second embodiment, in comparison with the preferred embodiment. They are as follows:

1. Less control of the filter and its draining oil during the inversion process. The filter could be placed on the screen first, and the container placed over it, but this will result in less control of the draining oil as well.

2. The funnel means would have to be fairly shallow to allow for clearance under the vehicle. This will result in more residual oil left on the surface of the funnel. With the preferred embodiment, all oily surfaces are enclosed.

3. This second embodiment cannot have a drain plate that controls backflow into the upper chamber during the pour off process, or transportation. The drain plate is eliminated due to the small aperture of the drain plate not allowing fast enough flow to accommodate the draining oil from the oil pan.

4. In order to alleviate the problem stated in number 3 above, the oil opening will have to be placed as far from the pour spout as possible. Therefore for the funnel to be efficient, it will protrude beyond the edge of the tank body, making it susceptible to damage in moving or transport.

5. If the funnel is made as a removable part, then there is the problem of either cleaning it, or storing it dirty, much less finding it, unbroken, when it is needed again. In addition, with the funnel removed it would be more difficult to seat the filter and container in draining position without residual oil problems on the tank body resultant from inverting the filter and container.

Other Embodiments and Their Ramifications

It is possible that using a common five gallon bucket, a device can be made which will achieve some of the same basic results as the preferred embodiment. A lid can be configured for the bucket which can double as a shallow drain pan to collect oil drained from the crankcase. This collected oil can be poured from the pan/lid into the bucket, and the bucket lidded with the pan/lid. With the bucket in the upright position, a screen or other positioning device can be used to hold filters for draining into the bottom of the bucket. This screen or device can be positioned to allow the filter to clear the oil below, but still allow the pan/lid to seal the device. Due to the cumbersomeness of this apparatus, it is not a preferred embodiment. Also, in the event of tipping, there is nothing to keep the filters from being subjected to the drained oil.

Summary, Ramifications and Scope

Accordingly, the reader will see that the invention presented in this application provides a way for the do-it-yourself oil and filter changer to safely and cleanly drain used oil from the crankcase and filter, seal and store both filter and drained filter oil in the same device that crankcase oil is stored in while keeping the drained filter separate from the drained and collected oil. This allows for ease of transport to a collection center or fits the needs of a curbside collection system.

The invention has the following advantages:

- Re-use time and again, thus reducing the need for disposing of oily bags, boxes, milk jugs, and other storage and transport wastes now currently adding to our landfill and water pollution problems.
- By allowing the DIY the convenience of using a sealed container for drainage, storage and transport of the used filter, as well the used oil, the temptation of improper disposal is lessened.
- No waiting period is needed to allow the oil filter to drain before placing it in a box, bag, etc. Once the filter is removed from the vehicle and placed in the apparatus, it is sealed and allowed to drain, negating the need of the DIY to return at a later time to attend to the oil filter. This one step operation will also help deter improper disposal.
- Subjection to heat by hot oil filters will not adversely affect the invention as it would plastic bags or paper boxes.
- In addition, if the filter is mangled some way in removal, leaving sharp edges or points, the filter container on the invention is less susceptible to punctures, tears, or cuts than bags or boxes.

The invention solves a problem that has recently become more apparent as used oil filters have been labeled a culprit of land and water pollution. By allowing the do-it-yourselfer a convenient, safe and clean means to manage his used oil filter along with his used oil, it hampers the tendency to improperly dispose of these recyclable wastes.

Although the description above of the preferred embodiment contains many specificities, these should not be construed as limiting the scope of this invention but as merely providing illustrations of the presently preferred embodiment of this invention. For example:

- The shape of the filter container could be square, oblong, etc.
- The sealing flanges could be other than screw-on, such as a snap-on, frictional seal.
- A wide variety of sealing means exists as well, including: neoprene gaskets, rubber gaskets, cork gaskets, etc.
- The drain plate in the drain lid could be corrugated, the vee could be inverted, it could be slightly convex or concave, etc.
- The drainage slot could be replaced with a series of voids, be they round, square, triangular, etc.
- Filter sleeve or spring could be designed in a variety of ways as in a coil, an air bladder, or concaving the sides of the filter container.
- Filter orientation could be effected by other means than a spring or sleeve.
- Filter container top could have supports designed into it to prevent tipping when it is on its top.
- The vent spout closure could be reconfigured as several types of screw-on systems, or could be a plug, instead of a cap.
- Likewise, the pour spout could be reconfigured as a snap-on fitting, or a retainer could be added.
- The shape of the oil collection tank could be round, square, trapezoidal, etc.
- The pour off truncation could be eliminated, or enlarged.
- The invention could also be made of several different types of plastics, as well as metals.
- Nodules could be designed into the bottom of the oil tank to reduce surface area contact between the tank and the surface it rests upon.
- Orientation of handles, connecting flanges, and other components of the preferred embodiment could be changed according to molding design changes.
- Surface of the invention could be designed to receive a variety of graphics or written materials, either permanent or removable.

It is apparent from previously mentioned examples that embodiments other than the preferred can achieve the same basic results as the preferred embodiment. Thus, the scope of the invention should be determined by the appended claims and their legal equivalents, rather than by the examples given.

What I claim is:

1. A device for the management, handling, storage, and transportation of spent materials collected during one or more oil changes comprising:

a) a container for collecting and covering a draining object, such as a used oil filter, said container having an upper member and an annular peripheral wall downwardly extending from the outer edge of said upper member, said upper member and said peripheral wall forming a cylindrical tube having an opening at an end opposite said upper member;

b) a receptacle having a bottom member, an upper member and a peripheral wall upwardly extending from the outer edge of said bottom member and intersecting with the outer edge of the upper member of said receptacle, said upper member of said receptacle having an opening of comparatively large size, thereby allowing for the collection of liquids without the use of funneling means, said opening further provides for passage of liquids into an inner cavity formed by said lower member, said peripheral wall and said upper member of said receptacle and c) a drain lid concurrently and removably joining said container to said receptacle, said drain lid comprising a circular plate with a downwardly extended annular collar at its periphery and an upwardly extended annular collar projecting from the upper surface of said circular plate, said circular plate having at least one void disposed within the periphery of said upwardly extended annular collar, said at least one void providing communication through said circular plate for liquid drained from said draining object wherein said drain lid provides support for said draining objects, keeping said draining objects separate from said collected liquids, while preventing backflow of said collected liquids from said receptacle into said container during handling of said device; and d) a discharge opening formed in the peripheral wall of said receptacle having an outwardly extending discharge neck depending therefrom, said discharge neck being provided with a removably engaging sealing cap, wherein said discharge neck allows for discharge of said collected liquids.

2. The container set forth in claim 1 further including positioning means to hold said draining object stable during draining, storage and transport.

3. The positioning means set forth in claim 2 comprising a removable spring action sleeve fitted within said container.

4. The container set forth in claim 3 further including a means to vent air during draining and discharge of collected fluids, said means to vent air comprising an upwardly extended vent neck located at the top of said handle providing communication through handle into interior cavity of said container.

5. The container set forth in claim 2 further including a handle located on said annular peripheral wall situated from end to end of said annular peripheral wall.

6. The vent neck set forth in claim 5 further including a removably engaging sealing vent cap.

7. The container and drain lid set forth in claim 1 further include releasably engaging corresponding threads, said container having male threads on the outside surface of said peripheral annular wall distal from its upper member and said drain lid having corresponding female threads situated on the inside of said upward extending annular collar.

8. The receptacle set forth in claim 1 wherein said opening of said receptable is formed by means of a neck upwardly projecting from said receptacle.

9. The receptacle and drain lid set forth in claim 8 further include releasably engaging corresponding threads, said receptacle having male threads on the outside surface of said upwardly projecting neck, and said drain lid having corresponding female threads situated on the inside of said downward extending annular collar.

10. The receptacle set forth in claim 1 further including a rear handle located distally from said discharge neck.

11. The receptacle set forth in claim 1 further including a front handle that serves as means of protection from damage to said discharge neck and said sealing cap.

12. The device set forth in claim 1 further including means to accept imprinted written or graphic materials on exterior surface of device.

13. The device set forth in claim 1 wherein said device is reuseable.

14. The drain lid set forth in claim 1 wherein the orientation of said at least one void allows for said liquids to drain from said draining objects into said receptacle, while reducing contamination of said draining objects by re-entry of said liquids oil from said receptacle into the cavity formed by said container, thereby constituting a valving means.

* * * * *